May 19, 1931.  C. D. MASON  1,805,830
FOAM DESTROYER
Filed May 20, 1929
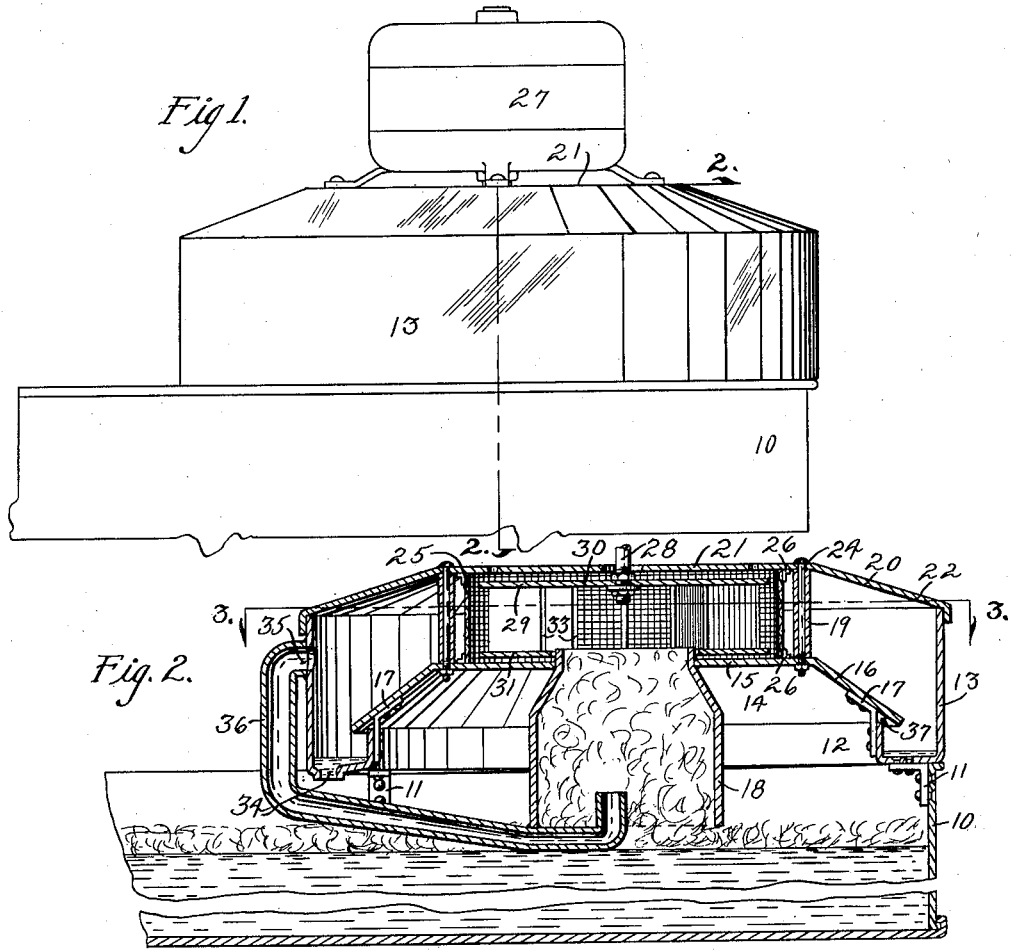
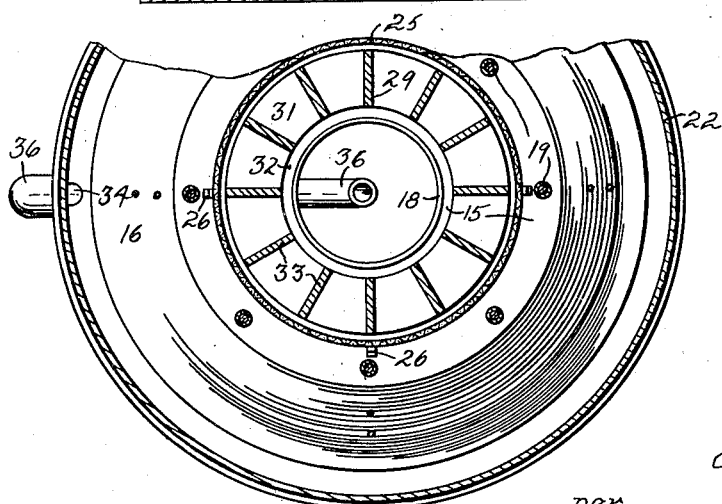
Inventor
Charles D. Mason
per
Attorneys Patented May 19, 1931

1,805,830

UNITED STATES PATENT OFFICE

CHARLES DOREL MASON, OF DES MOINES, IOWA

FOAM DESTROYER

Application filed May 20, 1929. Serial No. 364,503.

The object of my invention is to provide a device of simple, durable and inexpensive construction, which may be easily and quickly applied to the upper and open ends of a milk container adapted to receive milk from a cream separator and to break up and destroy the foam which forms on the upper surface of the milk as it is delivered to the tank, and to convert the foam into milk and return the same to the vat.

A further object is to provide in a foam destroyer of that type employing a centrifugal beater or fan and a screen means whereby the vapors formed by the milk and foam passing through the screen may again be returned to the foam destroyer.

More specifically it is the object of my invention to provide in connection with that type of foam destroyers in which is employed a centrifugal beater improved means whereby the foam will be more completely destroyed, and whereby the milk condensed by the action of the destroyer may be collected and delivered at a point a considerable distance from the inlet of the foam destroyer, so that the condensed milk will not again be carried through the destroyer, as is usually the case with that type of device now in commercial use.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of the upper edge of one end of a milk vat with my improved foam destroyer applied thereto.
Figure 2 is a vertical sectional view of same.

Figure 3 is a detail sectional view taken on the line 3—3 of Figure 2.

The numeral 10 indicates a milk vat such as used to receive separated milk from a cream separator. Supported on the upper edge of the vat 10 is an annular frame member 11 having inner and outer walls 12 and 13. Supported above the wall 12 is a plate 14 having the form of a truncated cone and comprising a top member 15 and a flange 16. The flange 16 is supported above the upper edge of the member 12 a slight distance by means of suitable legs or supports 17.

The central portion of the member 15 is provided with an opening in which is inserted the upper end of the spout 18, the lower end of which extends downwardly into the vat 10 a considerable distance. The outer edge of the plate 15 is provided with a series of upright tubular posts 19 on which are mounted a second conical plate 20, similar to the plate 14, having a central portion 21 and a flange 22, the edge of which is designed to rest on the upper edge of the wall member 13. Bolts 24 are provided for anchoring the plate 21 to the upper end of the members 19 and said members 19 into the plate 15.

Secured between the plates 15 and 21 is an annular screen 25 preferably made of what is commonly known as wire cloth, and is fixed in position by means of annular flanges 26 mounted on the inner faces of the members 15 and 21, so that the members 15 and 21 may be easily and quickly taken apart for the purpose of cleaning or for repairs, if so desired.

Mounted on the upper surface of the member 21 is an electric motor 27, or other suitable power device, having a downwardly projecting shaft 28 extending downwardly through the member 21. The lower end of the shaft 28 is provided with a fan 29, which comprises upper and lower plates 30 and 31. The plate 29 is secured to the shaft 28, while the plate 31 is provided with a central opening 32 for receiving the upper end of the spout 18.

The plates 30 and 31 have fan blades 33 rigidly secured between them, said blades being arranged in vertical planes radial with the shaft 28, so that the members 30, 31 and 33 operate in unison as a single fan unit. Said fan is designed to rotate freely within the annular screen 25. The member 11 is provided with an outlet opening 34.

It will readily be seen that if the motor 27 is operated and the shaft 28 and fan 29 are rapidly rotated, then a current of air will be induced in the spout 18 and delivered to the screen 25, so that when the foam rises in the vat 10 to a point where it nearly engages the lower edge of the spout 18, said foam will be drawn upwardly through said spout and driven by the fan 29 through the screen 25. This will break up the air bubbles and convert the foam into liquid, which is thrown against the members 22 and 13 and collected in the annular member 11, and discharged through the opening 34 a considerable distance from the inlet end of the spout 18, so that the milk may be again delivered to the vat and in such a concentrated manner as to pass through the foam on top of the liquid within the vat, without being drawn into the spout 18, as I find by actual practice that unless the condensed milk from the destroyer is carried to a remote point and allowed to pass through the foam or otherwise separated from it, the foam will carry a large portion of the milk back, causing a large amount of unnecessary power to operate the device.

I find in actual practice that a considerable amount of broken foam passes through the screen in the form of vapor, which would float through the room in which the vat is located and collect on various pipes or other articles.

To overcome this difficulty I have provided in the wall 13 an opening 35, which is substantially level with the fan 29. The opening 35 is provided with a return pipe 36, the discharge end of which is somewhat contracted, and projects upwardly into the lower end of the spout 18. The annular space between the member 12 and the flange 16 is of such dimensions that a slight pressure will be created in the chamber formed by the walls 12, 13, 16 and 22 against air passing outwardly through the opening 37, so that a large amount of the vaporous air will be caused to circulate through the return pipe 36 and be discharged into the spout 18. The discharge of the vaporous air will assist in drawing the foam into the said spout 18. The moisture from the vaporous air collects on or between the foam bubbles and is carried through the screen by said foam. The discharge opening 34 is also comparatively small, just large enough to permit the condensed milk to freely discharge.

By this arrangement it will be seen that as the motor 27 is rotated and the foam is elevated in the vat 10, the foam will be drawn upwardly through the spout and delivered to the screen 25 at a comparatively high velocity, breaking up the milk bubbles and discharging the condensed milk into the receptacle or trough 11. Means is also provided whereby the vaporous milk may again be fed to the device in such a manner that the air escaping through the slot 37 will be practically free of milk particles, a large portion of which will settle on the top of the liquid or foam within the vat due to the slowing up of the velocity of the vaporous air.

I am aware that centrifugal devices, such as a rotating fan, have been employed for the purpose of breaking up foam. These devices are very inefficient and require a large amount of power to operate them. Only a small percentage of the foam passing through the fan is actually broken up into condensed milk. The condensed milk which is thus formed is again thrown into the foam where it is recollected and again passes through the beater. It will readily be seen that the beater also has a tendency to create foam, and the greater amount of agitation required, the greater amount of foam created, so the device has more or less defeated the purpose for which it was intended.

I have found that by providing a suitable screen and means for delivering the foam through said screen at a comparatively high velocity, all of the foam is broken and condensed into milk, with the exception of the vapor before referred to.

It will thus be seen that I have provided a device which is comparatively simple and of cheap construction, which entirely eliminates the annoyance of having foam run over the top of the vats and onto the floor of the room in which they are contained, as is usually the case where a large amount of milk is being separated.

While I have used a woven wire as a screen, it will readily be seen that other types of screens might be substituted without departing from the spirit of my invention.

I claim as my invention:

1. A foam destroyer comprising a cylindrical screen, a fan rotatively mounted therein, a spout for conducting milk foam to the center of said fan, means for rotating said fan, and an annular housing about said screen for receiving the condensed milk and for discharging the same at a point remote from the receiving end of said spout, said housing including a vapor outlet, and a conductor in said outlet adapted to return vapors to the inlet end of said spout.

2. A foam destroyer comprising a screen, means for delivering foam to and through said screen at a high velocity for breaking the bubbles of the foam and condensing the same into a liquid, and means for returning vapors thus formed to said foamed delivering means.

Des Moines, Iowa, May 14, 1929.

CHARLES DOREL MASON.